(12) United States Patent
Cunningham

(10) Patent No.: US 6,351,394 B1
(45) Date of Patent: Feb. 26, 2002

(54) CONDUCTIVE FRAME FOR RECEIVING AN ELECTRONIC MODULE

(75) Inventor: Adam Douglas Cunningham, Uxbridge, MA (US)

(73) Assignee: Tyco Electronics Corporation, Wilmington, DE (US)

( * ) Notice: Subject to any disclaimer, the term of this patent is extended or adjusted under 35 U.S.C. 154(b) by 0 days.

(21) Appl. No.: 09/502,730

(22) Filed: Feb. 11, 2000

Related U.S. Application Data

(60) Provisional application No. 60/119,878, filed on Feb. 12, 1999.

(51) Int. Cl.[7] .................................................. H05K 9/00
(52) U.S. Cl. ....................... 361/818; 361/683; 361/685; 361/800; 361/816; 174/35 R
(58) Field of Search ................................ 361/752, 753, 361/799, 800, 816, 818, 683–685; 174/35 R

(56) References Cited

U.S. PATENT DOCUMENTS

| | | | | |
|---|---|---|---|---|
| 5,633,768 A | * | 5/1997 | Watanabe ................. 360/99.01 |
| 5,659,459 A | * | 8/1997 | Wakabayashi et al. ...... 361/753 |
| 5,726,864 A | * | 3/1998 | Copeland et al. ........... 361/800 |
| 5,740,001 A | * | 4/1998 | Flachslaender et al. ....... 361/91 |
| 5,767,999 A | | 6/1998 | Kayner ....................... 359/163 |
| 5,864,468 A | | 1/1999 | Poplawski ................... 361/753 |
| 5,879,173 A | | 3/1999 | Poplawski ................... 438/138 |
| 6,047,172 A | | 4/2000 | Babineau et al. ............ 455/300 |
| 6,078,504 A | * | 6/2000 | Miles .......................... 361/727 |
| 6,178,896 B1 | * | 1/2001 | Flickinger et al. .......... 361/816 |
| 6,215,666 B1 | * | 4/2001 | Hileman et al. ............. 361/752 |

OTHER PUBLICATIONS

AMP is Taking Fibre Channel from . . . , Connecting at a Higher level.™.
AMP Catalog 889003, Issued 11–96, pp. 19–21.
FCI Electronics, Customer Drawing No. 84790, Sheets 1 & 2. Dated Nov. 17, 1998.
FCI Electronics, Customer Drawing No. 84791, Sheets 1–5, Dated Oct. 13, 1998.

* cited by examiner

*Primary Examiner*—Jeffrey Gaffin
*Assistant Examiner*—Tuan Dinh

(57) ABSTRACT

A conductive frame (10) comprises an upper wall (12) and side walls (14, 16) depending downwardly therefrom, the upper wall having an elongated opening (32) adjacent a front end thereof, board-mounting members (20, 22) extend outwardly from bottom surfaces of the side walls (14, 16) for mounting the frame onto a circuit board (28), a closure door (44) is positioned across the conductive frame including pivot members (46, 48) thereon disposed in pivot-receiving members (50) of the conductive frame so that the closure door can be moved from a closed position to an open position when an electronic module is positioned within the conductive frame, and a spring member (52) is mounted on the closure door and the conductive frame thereby maintaining the closure door in the closed position.

24 Claims, 2 Drawing Sheets

CONDUCTIVE FRAME FOR RECEIVING AN ELECTRONIC MODULE

This application claims benefit to Provisional Application No. 60/119,878 filed Feb. 12, 1999.

FIELD OF THE INVENTION

The present invention relates to conductive frames for receiving electronic modules and, more particularly, to conductive GBIC frames.

BACKGROUND OF THE INVENTION

GBIC (Gigabit Interface Converter) frames currently in use in which GBIC electronic modules are guided and positioned are made of rigid plastic material as disclosed in U.S. Pat. No. 5,767,999. Shielding members and a spring-biased metal closure member are mounted at the front entrance of the GBIC frames to prevent EMI from affecting the GBIC electronic modules and to contain the EMI. The plastic GBIC frames are satisfactory for the electronic modules of lower speed systems; however, as higher speed systems have developed, greater EMI shielding is required. Moreover, the GBIC plastic frames are not able to be reflowsoldered to a circuit board and they must be mounted on the circuit board after the connectors and other components are soldered to the circuit board. This increases the applied cost of the GBIC systems to customers.

SUMMARY OF THE INVENTION

An important feature of the present invention is a conductive GBIC frame that provides complete EMI shielding for high speed systems. Another important feature is that the conductive GBIC frames can be reflow-soldered onto a circuit board at the same time electrical connectors and other components are soldered thereto thereby substantially decreasing the cost of manufacture. A further important feature is that the conductive GBIC will pass the finger probe test required by Underwriters Laboratory (UL).

A GBIC frame according to the present invention comprises a conductive frame including an upper wall and side walls depending downwardly therefrom, board-mounting members at bottom ends of the side walls for disposition in holes in a circuit board onto which the conductive frame is to be mounted, the upper wall has an elongated opening adjacent a front end of the conductive frame, a closure door is positioned across the conductive frame through the elongated opening and is pivotally mounted to the side walls, and a spring member is mounted on the closure door and the conductive frame thereby biasing the closure door to a normally closed position.

A metal closure member is mounted over the elongated opening of the conductive frame after the closure door has been positioned within the conductive frame.

Shielding members are mounted on upper and lower members of the front end of the conductive frame.

BRIEF DESCRIPTION OF THE DRAWINGS

An embodiment of the present invention will now be described by way of example with reference to the accompanying drawings in which.

DETAILED DESCRIPTION OF THE INVENTION

Figure 1:
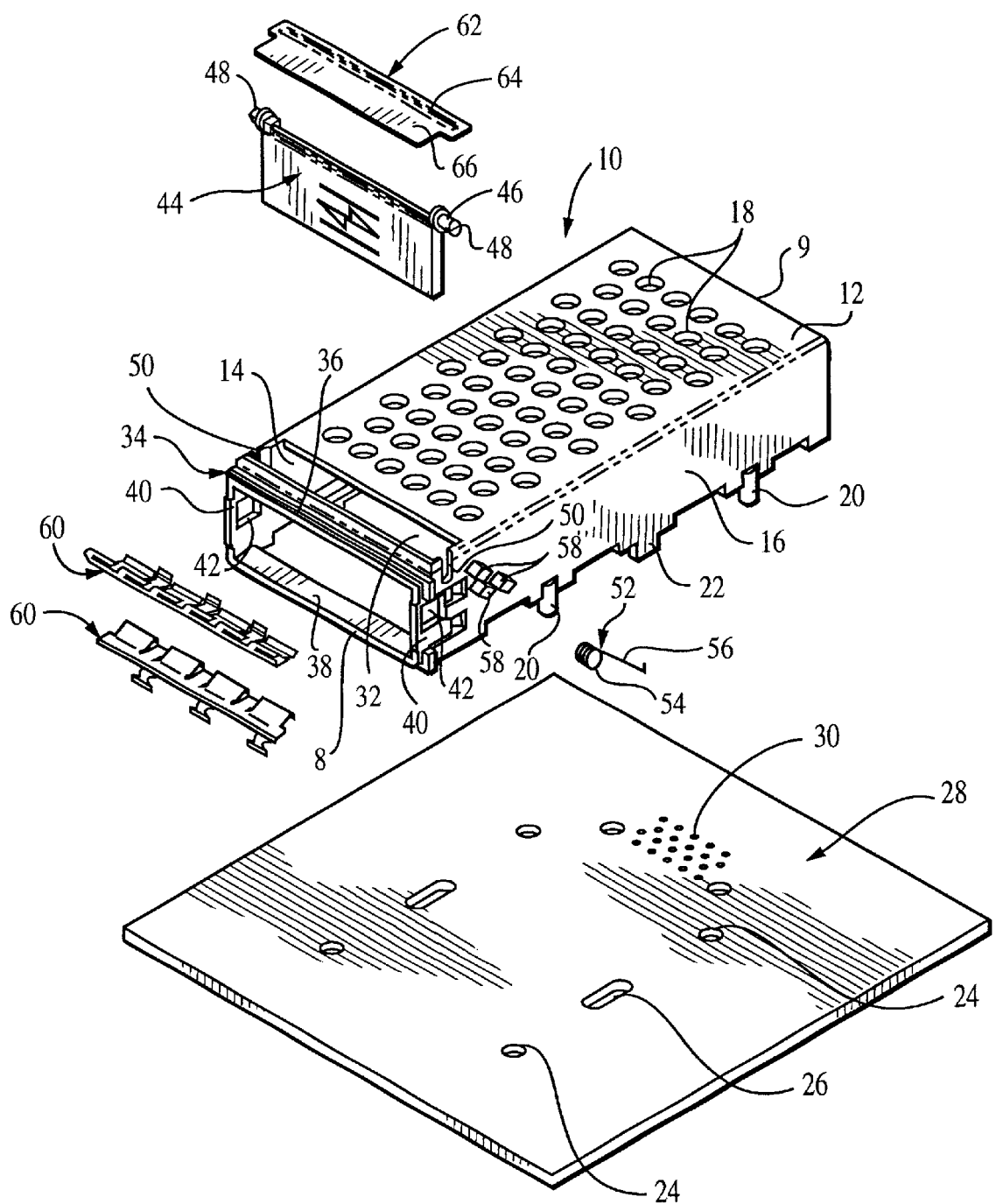
FIG. 1 is an exploded perspective view of a conductive GBIC frame, parts thereof and a circuit board.
Figure 2:
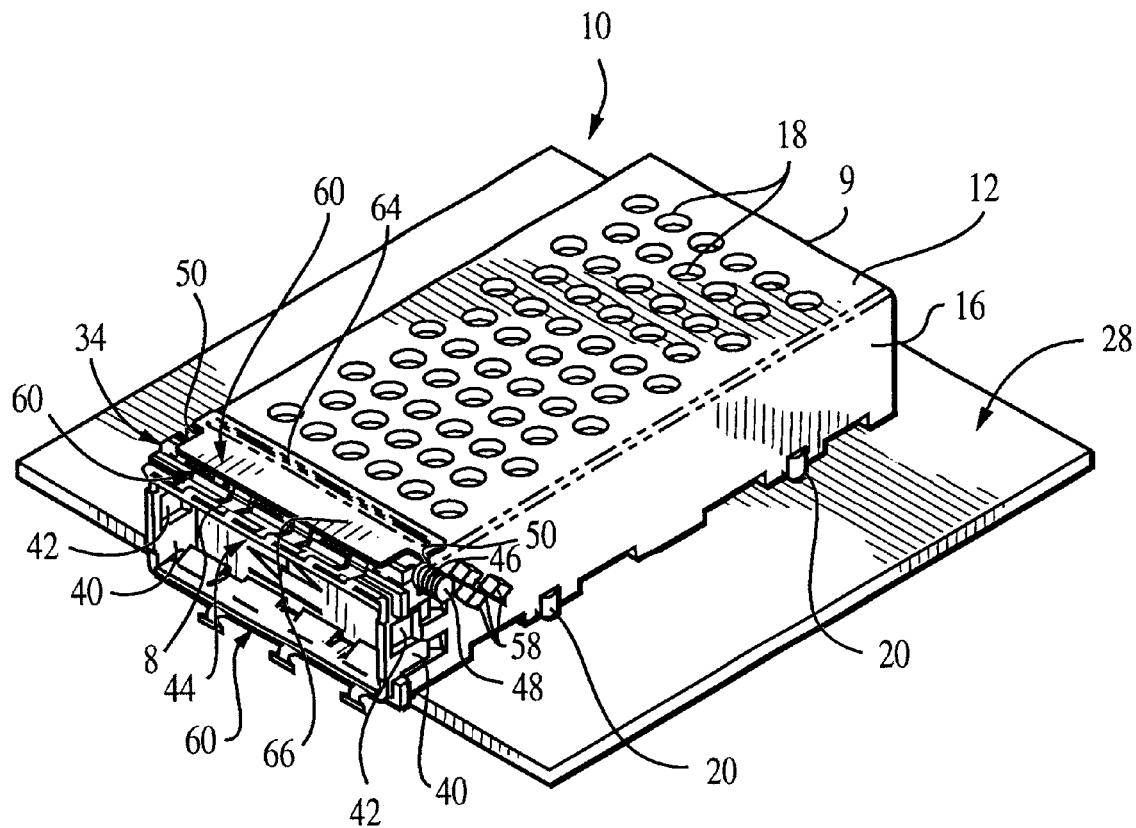
FIG. 2 is a perspective view showing an assembled conductive GBIC frame mounted on the circuit board.

As shown in the drawings, a conductive GBIC frame 10 is made by die-casting from zinc, and it includes an upper wall 12 and side walls 14, 16 which depend downwardly therefrom at side edges thereof so that the side walls are normal to the circuit board 28 as they face each other. The upper wall 12 has rows of holes 18 extending therethrough for ventilation purposes.

Integral pins 20 and a rectangular projection 22 therebetween comprise board-mounting members that extend downwardly from bottom surfaces of the side walls 14, 16, with only those of side wall 16 being shown, for positioning in plated-through holes 24 and plated-through oblong holes 26 of circuit board 28. Holes 24, 26 can be connected to a ground plane on the circuit board 28. Other plated-through holes 30 are located in the circuit board 28 which receive pins of electrical contacts and mounting pins of an electrical connector (not shown) which will be covered by the GBIC frame 10 when it is secured onto the circuit board 28 via reflow solder. Thus, the GBIC frame, the electrical connector and other components will be soldered simultaneously onto the circuit board thereby reducing the cost of manufacture.

The GBIC frame 10 extends longitudinally from a front end 8 to a back end 9. At the front end 8 of the GBIC frame 10, the upper wall 12 has an elongated opening 32 that extends laterally across the GBIC frame. The elongated opening 32 is located adjacent to a rectangular-shaped front section 34 which includes upper and lower members 36, 38 and side members 40 forming an entrance to the GBIC frame 10. Each of side members 40 has a square hole 42 therethrough.

A metal closure or dust door 44 has pivot pins 46 at an upper end thereof which extend outwardly from the sides. Pivot pin 46 has a slot 48 therein. Door 44 is disposed within the GBIC frame 10 through the elongated opening 32 with pivot pins 46 being disposed within recesses 50 in the side walls 14, 16 thereby enabling door 44 to move between an open position and a closed position. Inner ends of recesses 50 are radiused for ease of operation of the pivot pins 46 therein.

The GBIC frame is plated with copper and nickel after which a plating of tin lead is applied for flow soldering the GBIC frame to the plated-through holes of the circuit board. Door 44 is plated with copper and nickel.

A spring 52 has a coil section 54 that is mounted on pivot pin 46 with a linear end of the coil section being disposed in slot 48 of pivot pin 46. A linear section 56 of spring 52 is disposed between lugs 58 extending outwardly from the side wall 16 of the GBIC frame 10 adjacent recess 50. Spring 52 therefore maintains door 44 in a normally closed position.

Shielding members 60 are mounted onto upper and lower members 36, 38 of the front section 34. Shielding members 60 are disclosed in U.S. Patent Application Serial No. 60/122330, filed Mar. 2, 1999, and they include ground contact members for electrically connecting to a panel to which the GBIC frames are mounted as disclosed in U.S. Pat. No. 5,767,999, retention members for engaging the upper and lower members 36, 38 and spring contact members for electrically engaging the door 44 and to electrically engage a shield on an electronic module when positioned within the GBIC frame.

A metal closure member 62 is press-fitted into the elongated opening 32 of the GBIC frame 10 after door 44 is mounted in position thereon. Closure member 62 has an arcuate channel 64 that extends into the GBIC frame 10 adjacent the upper end of door 44 and a plate section 66 that extends across the elongated opening 32 thereby preventing any EMI from leaving the GBIC frame or entering it via opening 32.

Thus, when an electronic module is inserted into the GBIC frame 10, it moves door 44 upwardly against the bias of spring 52, the electronic module is guided along the GBIC frame via rails disposed along inside surfaces of the side walls 14, 16 until the electrical connector of the electronic module electrically connects with the electrical connector mounted on the circuit board 28, and the spring contact members of the shielding member 60 on the upper member 36 electrically engage the closure door and both shielding members 60 electrically engage the shield member on the electronic module. Sections of latches on the electronic module engage the square holes 42 in side walls 14, 16 to latch the electronic module within the GBIC frame. Thus, the electronic module is shielded from EMI interference as a result of the metal GBIC frame 10.

The fact that the GBIC frame 10 completely covers the space that the electronic module occupies when it is positioned therein, enables the GBIC frame to pass the finger probe test of the UL for assemblies such as these.

When the electronic module is removed from the GBIC frame 10, door 44 is moved to its closed position via spring 52 against the spring contact members of the shielding members 60. Thus, the GBIC frame 10 including the door 44 and closure member 62 completely prevent EMI from leaking from the GBIC frame. Also, dust or other foreign matter are inhibited from entering the frame.

If desired, the GBIC frame can be molded from a suitable plastic material impregnated with metallic particles to render it conductive. Such materials can be obtained from LNP Engineering Plastics, Exton, PA or RTP Co., Winona, Minn. The plastic conductive GBIC frame can then be mounted on the circuit board in the same manner as the GBIC frames are mounted on the circuit board as disclosed in U.S. Pat. No. 5,767,999.

Alternatively, the GBIC frame can be molded from a suitable plastic material which is then metal plated with copper, nickel and tin lead as is done with the zinc frame described above. Such a frame can be soldered onto the circuit board and provides optimum EMI shielding in the same manner as the metal frame.

Because the frame itself is conductive, it provides additional points of electrical engagement between the frame and the GBIC module that would be loaded therein. In the current design, the only electrical engagement between the frame and the module is achieved with the ground contact members that extend from the front shield members. These provide some points of engagement, but they are not stable and are affected by movement of the module caused by vibrations in a particular system or by a person using the system. The conductive frame provides multiple additional points of electrical engagement between the frame and the module. This increases the grounding effectiveness of the system and reduces the variation that takes place when vibration is introduced.

The metal and plated plastic frames are soldered hard to the system board. The current plastic frame snaps into the board and results in a substantial amount of play. The sturdiness of the connection to the circuit board provides greater stability and reliability of the system.

From the foregoing, a metal GBIC frame has been described that provides optimum EMI shielding for electronic modules positioned therein, it can be flow soldered onto a circuit board along with its electrical connector and other components thereby reducing the cost of manufacture, and it readily passes the finger probe test.

I claim:

1. A conductive frame for receiving an electronic module therein and for mounting onto a circuit board, comprising:
   an upper wall having side walls depending therefrom, the upper wall and the side walls being electrically conductive, the upper wall and the side walls extending substantially from a back end to a front end of the conductive frame, the upper wall having an elongated opening adjacent to the front end of the conductive frame; and
   a door inserted through the elongated opening and positioned within the conductive frame, the door being pivotally mounted to the conductive frame so that the door can be moved from a closed position to an open position when the electronic module is inserted into the conductive frame.

2. A conductive frame as claimed in claim 1, wherein a spring member is mounted on the door and the conductive frame thereby biasing the door toward the closed position.

3. A conductive frame as claimed in claim 1, wherein board-mounting members extend outwardly from bottom surfaces of the side walls for mounting the conductive frame onto the circuit board.

4. A conductive frame as claimed in claim 1, wherein the upper wall has ventilation holes therethrough.

5. A conductive frame as claimed in claim 1, wherein a plate section extends across the elongated opening.

6. A conductive frame as claimed in claim 5, wherein the plate section is constructed of a conductive material.

7. A conductive frame as claimed in claim 5, wherein the plate section has an arcuate channel which extends into the elongated opening.

8. A conductive frame as claimed in claim 7, wherein the arcuate channel abuts an edge of the door.

9. A conductive frame as claimed in claim 1, wherein the upper wall has ventilation holes therethrough.

10. A conductive frame as claimed in claim 1, wherein a front section is provided at front ends of the upper and side walls and includes upper, lower and side members.

11. A conductive frame as claimed in claim 10, wherein shielding members are mounted on the upper and lower members.

12. A conductive frame as claimed in claim 11, wherein the shielding members include spring contact members electrically engaging the door when in the closed position and the spring contact members of the shielding member on the upper member are in constant electrical engagement with the door.

13. A conductive frame as claimed in claim 1, wherein the conductive frame is metal.

14. A conductive frame as claimed in claim 13, wherein the metal frame is plated with copper, then nickel and over the nickel a coating of tin lead.

15. A conductive frame as claimed in claim 1, wherein the conductive frame is plastic impregnated with metal particles.

16. A conductive frame as claimed in claim 1, wherein the conductive frame is plastic plated with copper, then nickel and over the nickel a coating of tin lead.

17. A conductive frame for receiving an electronic module therein and for mounting onto a circuit board, comprising
   an upper wall having side walls depending therefrom along side edges thereof, the upper wall having an elongated opening adjacent a front end thereof;

a front section disposed at front ends of the upper and side walls having upper, lower and side members, the upper and lower members having shielding members;

board-mounting members extending outwardly from bottom surfaces of the side walls for mounting the conductive frame onto the circuit board; and a door positioned across the conductive frame including pivot members thereon disposed in pivotreceiving members of the conductive frame so that the door can be moved from a closed position to an open position when the electronic module is positioned within the conductive frame.

18. A conductive frame as claimed in claim 17, wherein the upper wall has ventilation holes therethrough.

19. A conductive frame as claimed in claim 17, wherein a metal closure member is mounted on the upper wall covering the elongated opening.

20. A conductive frame as claimed in claim 17, wherein the shielding members include spring contact members electrically engaging the door when in the closed position and the spring contact members of the shielding member on the upper member are in constant electrical engagement with the door.

21. A conductive frame as claimed in claim 17, wherein the conductive frame is metal.

22. A conductive frame as claimed in claim 21, wherein the metal frame is plated with copper, then nickel and over the nickel a coating of tin lead.

23. A conductive frame as claimed in claim 17, wherein the conductive frame is plastic impregnated with metal particles.

24. A conductive frame as claimed in claim 17, wherein the frame is plastic plated with copper, then nickel and over the nickel a coating of tin lead.

* * * * *